US012633155B1

(12) United States Patent

Hofman

(10) Patent No.: US 12,633,155 B1

(45) Date of Patent: May 19, 2026

(54) AUTOMATED HOV VIOLATION DETECTION

(71) Applicant: OMNIQ CORP., Salt Lake City, UT (US)

(72) Inventor: Yoram Hofman, Kefar Bialik (IL)

(73) Assignee: OmniQ Corp., Salt Lake City, UT (US)

( * ) Notice: Subject to any disclaimer, the term of this patent is extended or adjusted under 35 U.S.C. 154(b) by 0 days.

(21) Appl. No.: 17/237,044

(22) Filed: Apr. 21, 2021

Related U.S. Application Data

(60) Provisional application No. 63/013,523, filed on Apr. 21, 2020.

(51) Int. Cl.
| | |
|---|---|
| *G06V 40/10* | (2022.01) |
| *G06N 3/02* | (2006.01) |
| *G06V 10/60* | (2022.01) |
| *G08G 1/017* | (2006.01) |

(52) U.S. Cl.
CPC ............. *G06V 40/103* (2022.01); *G06N 3/02* (2013.01); *G06V 10/60* (2022.01); *G08G 1/0175* (2013.01); *G06V 2201/08* (2022.01)

(58) Field of Classification Search
CPC .. G06V 40/103; G06V 10/60; G06V 2201/08; G06N 3/02; G08G 1/0175
See application file for complete search history.

(56) References Cited

U.S. PATENT DOCUMENTS

| | | | | |
|---|---|---|---|---|
| 2008/0175438 A1* | 7/2008 | Alves | ................... | G08G 1/0175 |
| | | | | 382/104 |
| 2009/0309974 A1* | 12/2009 | Agrawal | ................ | G08G 1/054 |
| | | | | 709/201 |
| 2012/0147194 A1* | 6/2012 | Wang | ................... | G06V 20/593 |
| | | | | 382/192 |
| 2012/0262577 A1* | 10/2012 | Wang | ........................ | G06T 7/11 |
| | | | | 348/148 |
| 2013/0141574 A1* | 6/2013 | Dalal | ................... | G06V 10/143 |
| | | | | 348/148 |
| 2020/0184674 A1* | 6/2020 | Hayashi | ................ | G06V 20/593 |
| 2021/0053523 A1* | 2/2021 | Miyamoto | ......... | G01G 19/4142 |

OTHER PUBLICATIONS

Wshah ("Deep Learning Architectures for Domain Adaptation in HOV/HOT Lane Enforcement") 2016 IEEE Winter Conference on Applications of Computer Vision, (Year: 2016).*

* cited by examiner

*Primary Examiner* — Molly Wilburn

(74) *Attorney, Agent, or Firm* — Bochner PLLC; Ariel Reinitz

(57) ABSTRACT

Systems and methods are disclosed for automated HOV violation detection. In one implementation, a presence of a vehicle is detected within a traffic lane. Based on the detection of the vehicle, one or more second images and one or more third images are captured. The images are processed using a neural network. Based on the processing using the neural network, a number of occupants within the vehicle is determined. Operations are initiated based on the determination.

14 Claims, 11 Drawing Sheets

400

AUTOMATED HOV VIOLATION DETECTION

PRIORITY CLAIM

This application is related to and claims the benefit of priority to U.S. Patent Application No. 63/013,523, filed Apr. 21, 2020, which is incorporated herein by reference in its entirety.

TECHNICAL FIELD

Aspects and implementations of the present disclosure relate to data processing and, more specifically, but without limitation, to automated HOV violation detection.

BACKGROUND

High-occupancy vehicle (HOV) lanes are restricted traffic lanes designated for use by vehicles with a driver and one or more passengers. Drivers may improperly use such lanes, in violation of laws, traffic regulations, etc.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Figure 1:
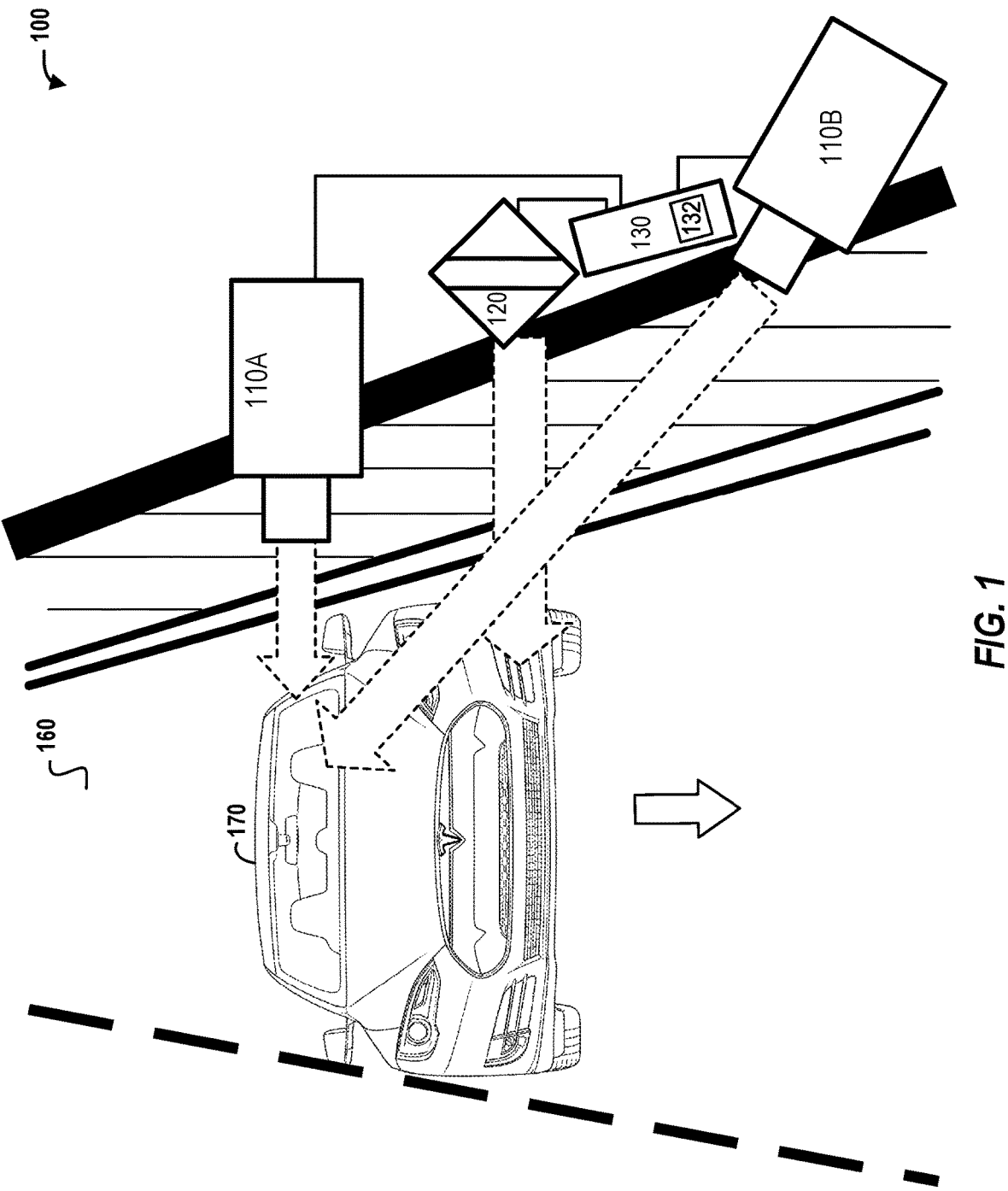
FIG. 1 illustrates an example system, in accordance with an example embodiment.

Aspects and implementations of the present disclosure are directed to automated HOV violation detection.

High-occupancy vehicle (HOV) lanes are restricted traffic lanes designated for use by vehicles with a driver and one or more passengers (e.g., carpools, vanpools, buses, etc.). Such lanes can also be referred to as carpool lanes, diamond lanes, 2+ lanes, transit lanes, and T2 or T3 lanes.

Such HOV lanes can be advantageous for numerous reasons. For example, ever-growing numbers of vehicles traveling through a limited traffic infrastructure poses considerable challenges to urban planners, citizens, and others. Implementing HOV lanes is one preferred solution to these challenges. Such HOV lanes can reduce the number of vehicles on the road by incentivizing drivers into shared driving (e.g., by rewarding high-occupancy vehicles with faster travel times).

The advantages of HOV lanes make them susceptible to high levels of "cheating" or abuse, especially during high-traffic time (e.g., "rush hours"). For example, vehicles with only a single occupant often violate applicable regulations by driving through an HOV lane, defeating the purpose of these restricted lanes. While authorities can attempt to enforce such regulations (e.g., via fines or traffic stops), manual monitoring and enforcement operations are difficult and costly. Therefore, there is a growing need for technologies capable of automatically detecting HOV lane violations.

The described technologies include an HOV detection system and related technologies. Such a system can include components that can be positioned above, on the side of, or otherwise proximate to traffic lanes (e.g., roads, highways, etc.), such as HOV lanes. Such technologies can be configured to identify occupant(s) within the vehicle and determine their number. In certain implementations, the described technologies can provide outputs such as license plate identification (e.g., via license plate recognition or LPR), the number of occupants, metric(s) reflecting the confidence of such determination(s)/analysis, and/or images (e.g., front and side images of the vehicle). In certain implementations, certain aspects or elements (e.g., items reflected in the captured images) can be obscured to protect the privacy of the occupants (e.g., blurring the faces of occupants).

In certain implementations, upon computing a certain result (e.g., a violation of HOV lane regulations) various operations can be initiated. For example, alert(s) or other notifications can be generated, activated, and/or provided (e.g., in case of single occupancy vehicle traveling in a 2+ lane, or a double-occupancy vehicle for a 3+ lane). Corresponding record(s) can be transmitted (e.g., to an external processing center/device for offline processing, manual review, etc.,) and/or used in real time (e.g., to dispatch an officer to stop the vehicle, issue a fine, etc.).

Currently, HOV-violation enforcement is performed manually. For example, a police officer observes HOV-lane violations and pulls over offending drivers/vehicles. This leads to frequent human error, e.g., with respect to mistakes in counting vehicle occupants (e.g., when passengers are children and may be more difficult to identify when the vehicle is traveling at high speed). Additionally, in many scenarios there may not be safe places on freeways for police to pull drivers over, park a patrol car, etc. Police pursuits of violators also pose dangers to police and other drivers (e.g., due to high speeds, lane changes, merging into busy traffic, roadside activity, etc.). As a result, HOV lane violations often go unenforced, encouraging further abuse by drivers.

Accordingly, automated violation detection and enforcement is needed. The described technologies provide automated solutions for detecting the number of occupants inside the vehicles and further initiating enforcement actions and other operations, as described herein.

The described technologies address these and other shortcomings by automating various aspects of the detection of such violations, e.g., using image processing, machine learning, artificial intelligence, and other techniques. For example, the described technologies can be configured to automatically compute various determinations, such as by processing captured image(s) to detect the number of occupants traveling inside a vehicle. Based on such detections/determinations, the described technologies can be further configured to initiate further actions/operations, such generating/providing related notifications, alerts, etc. For example, instances in which drivers violate HOV-lane regulations (e.g., by driving with fewer occupants than required) can be identified and further actions and/or operations (e.g., ticketing or other enforcement) can be initiated.

In certain implementations, the described technologies can incorporate imaging device(s) (e.g., cameras) and apply artificial intelligence and/or machine learning techniques to captured image(s), e.g., to detect vehicle occupants. By way of illustration, upon detecting a presence of a vehicle (e.g., via one or more sensor(s), triggers, etc.), various cameras capture images (e.g., line scan images) of the vehicle. Using deep learning networks and/or other image processing techniques, the described technologies can enhance/optimize the captured image(s), detect the presence of user(s) and/or their number, and initiate further actions or operations (e.g., reporting violations, ticketing, etc.).

It can therefore be appreciated that the described technologies are directed to and address specific technical challenges and longstanding deficiencies in multiple technical areas, including but not limited to image processing, machine learning, and artificial intelligence. As described in detail herein, the disclosed technologies provide specific, technical solutions to the referenced technical challenges and unmet needs in the referenced technical fields. These technologies also provide numerous advantages and improvements upon conventional approaches, such as those described here. Additionally, in various implementations one or more of the hardware elements, components, etc., referenced herein operate to enable, improve, and/or enhance the described technologies, such as in a manner described herein.

FIG. 1 illustrates an example system 100, in accordance with some implementations. As shown, the system 100 includes components such as imaging devices 110A, 110B, etc., (collectively imaging devices 110). Such imaging devices can be, for example, optical capture devices such as cameras and can be positioned at various locations in relation to an HOV lane 160, as shown. For example, one camera 110A can be positioned for viewing the side of a vehicle 170 while another camera 110B can be positioned towards the front of the vehicle (e.g., as it passes through the HOV lane 160).

As also shown in FIG. 1, one or more sensors 120 (e.g., a motion sensor or detector) can be utilized, e.g., to trigger the cameras 110 to capture image(s), e.g., of various detection event(s) (e.g., corresponding to the passing of the vehicle). In certain implementations, other camera(s) 110C (e.g., an LPR camera) can be positioned in various locations, e.g., to capture the license plate registration number. As also shown in FIG. 1, a device 130 (e.g., a controller device) can be configured to connect to and/or otherwise communicate with the referenced camera(s) and sensor(s), and can further control their operation, send/receive data, process information, etc., as described herein.

Figure 11:
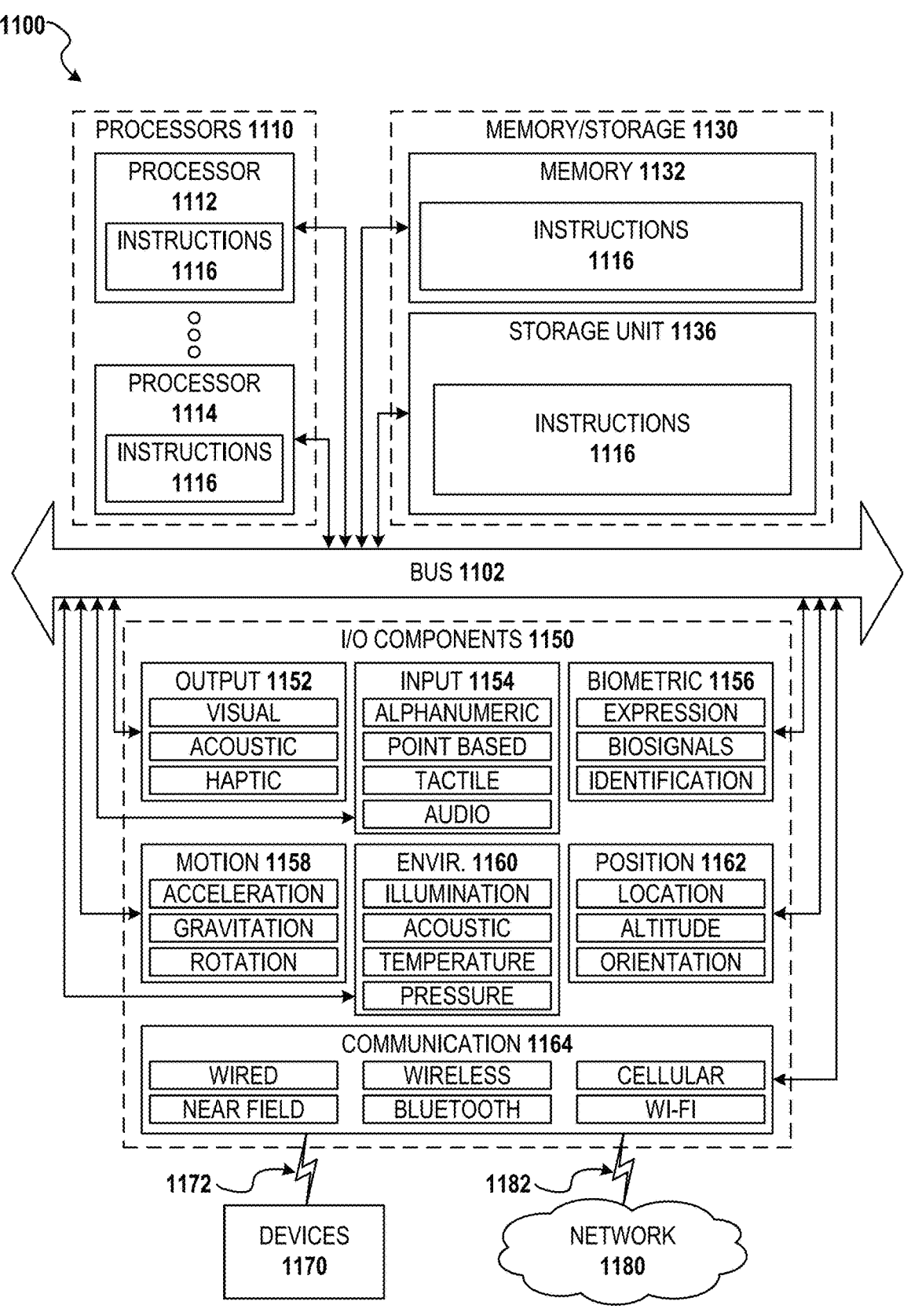
FIG. 11 is a block diagram illustrating components of a machine able to read instructions from a machine-readable medium and perform any of the methodologies discussed herein, according to an example embodiment.

Controller/device 130 can include a laptop computer, a desktop computer, a terminal, a mobile phone, a tablet computer, a server, a wearable device, a personal digital assistant (PDA), a digital music player, a connected device, a speaker device, and the like. In certain implementations, controller 130 can execute application(s) 132 such as programs, modules, or other executable instructions that configure/enable the device to interact with, provide content to, and/or otherwise perform operations (e.g., image processing operations) as are described herein. Such application(s) can be stored in memory of device 130 (e.g. memory 1130 as depicted in FIG. 11 and described below). One or more processor(s) of device 130 (e.g., processors 1110 as depicted in FIG. 11 and described below) can execute such application(s).

As noted, and other described features, as implemented with respect to one or more particular machine(s), can improve the functioning of such machine(s) and/or otherwise enhance numerous technologies including those enabling the security, execution, and management of various digital transactions and operations, as described herein.

It should be noted that while aspects of the described operations are are depicted and/or described as being performed on device 130, this is only for the sake of clarity. However, in other implementations such elements can also be implemented on other devices/machines. For example, in lieu of executing locally at device 130, aspects of such operations be implemented remotely (e.g., on a server device or within a cloud service or framework). By way of further example, in lieu of executing at device 130, aspects of such operations be implemented at camera(s) 110 (e.g., via embedded processors integrated within such camera(s)).

Moreover, these and other described features, as implemented with respect to one or more particular machine(s), can improve the functioning of such machine(s) and/or otherwise enhance numerous technologies including those enabling the security, execution, and management of various digital transactions and operations, as described herein.

While many of the examples described herein are illustrated with respect to a single machine (e.g., camera(s) 110, controller 130, etc.), this is simply for the sake of clarity and brevity. However, it should be understood that the described technologies can also be implemented (in any number of configurations) across multiple servers and/or other computing devices/services.

Figure 8:
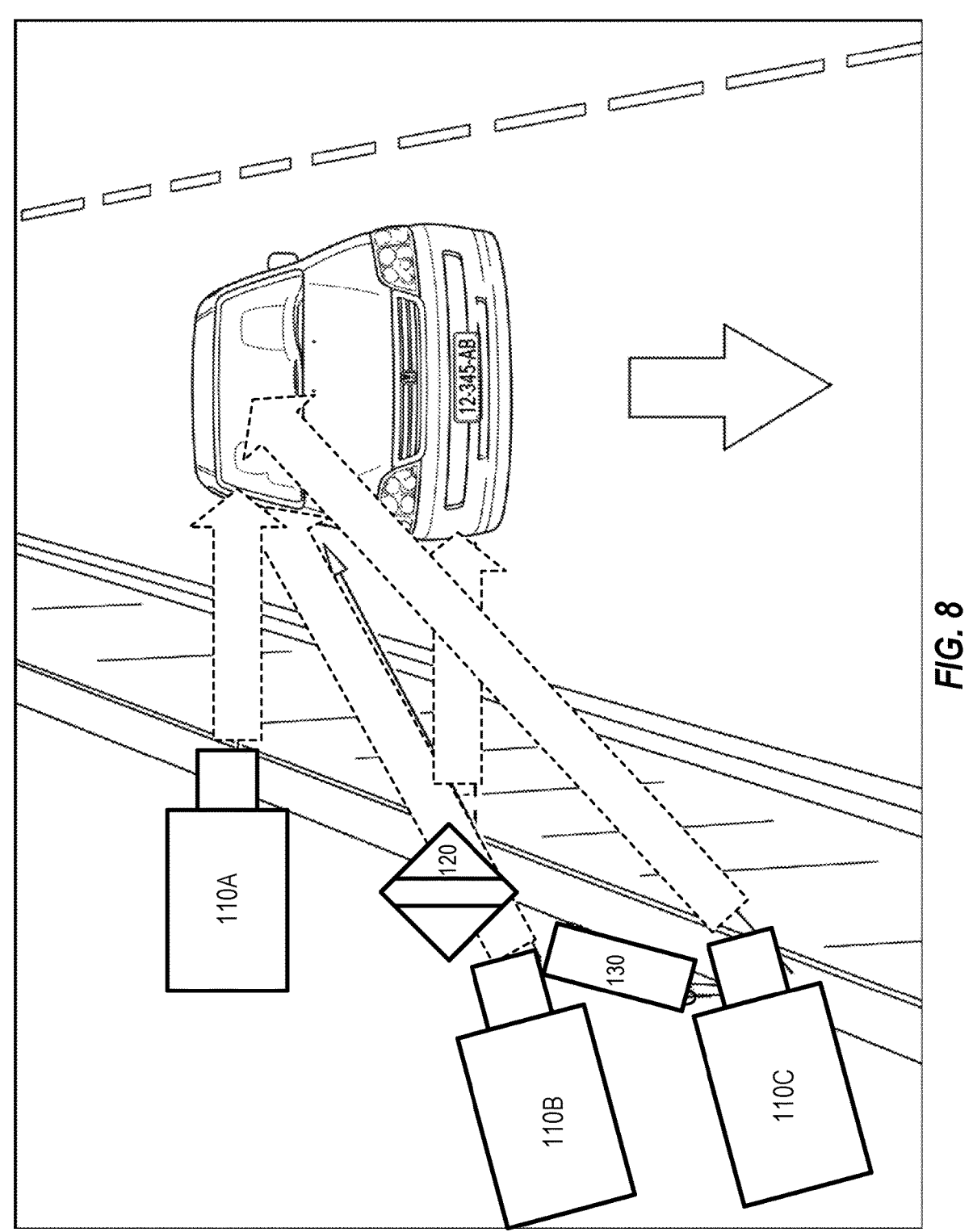
FIG. 8 illustrates further aspects of the described technologies.

FIG. 8 depicts an alternate implementation, e.g., with respect to a right side HOV lane. As shown in FIG. 8, cameras 110A and 110B are located at the side of the HOV lane, viewing the right side, and/or the front side of the vehicle passing through the HOV lane. A sensor 120 (e.g., a detector) is used to trigger the cameras to capture at the detection event. An LPR camera 110C can also be located on the front, rear side or both sides to capture the license plate registration number.

To enable 24/7 operation, the described technologies can implement illumination device(s). In certain implementations, such illumination devices/sources can be integrated within the described camera(s) 110. Such illumination sources can be configured to enable image capture under most or all settings. In certain implementations, infrared illumination source(s) can be used, e.g., prevent distracting the driver and occupants. Such an illumination source can be configured to be strong enough to enable image capture in a manner that the reflection of the light from the skin of the occupants is visible.

In certain implementations, Near Infrared (Near IR) and Short-Wave IR (SWIR) illumination sources can be utilized. Such illumination spectrum(s) can be invisible to human eye and can penetrate a car's windshields to enable in-cabin detection of various users based on the captured images. In other implementations, Light Emitting Diodes (LEDs) can be used to provide illumination.

As shown in FIG. 1, in one example implementation two camera/illumination units 110 can be positioned on each view of the vehicle (one positioned to view the driver and front passenger, the other to view the rear passengers). FIG. 1 depicts such an implementation with respect to a left side lane, where the driver side is adjacent to the road's side wall. For each view, one camera/illumination unit can capture an image on a low band, while the other camera/illumination unit captures an image on a high band. Additionally, in certain implementations an LPR camera can capture the license plate from the front or rear (e.g., as shown in FIG. 8), e.g., to identify the vehicle registration to identify the violator.

As noted, in certain implementations the described technologies can be implemented with respect to cameras with dual band outputs. Doing so can be advantageous with respect to synchronization of the two band images, as they are captured inside the same camera and same lens.

Figure 2:
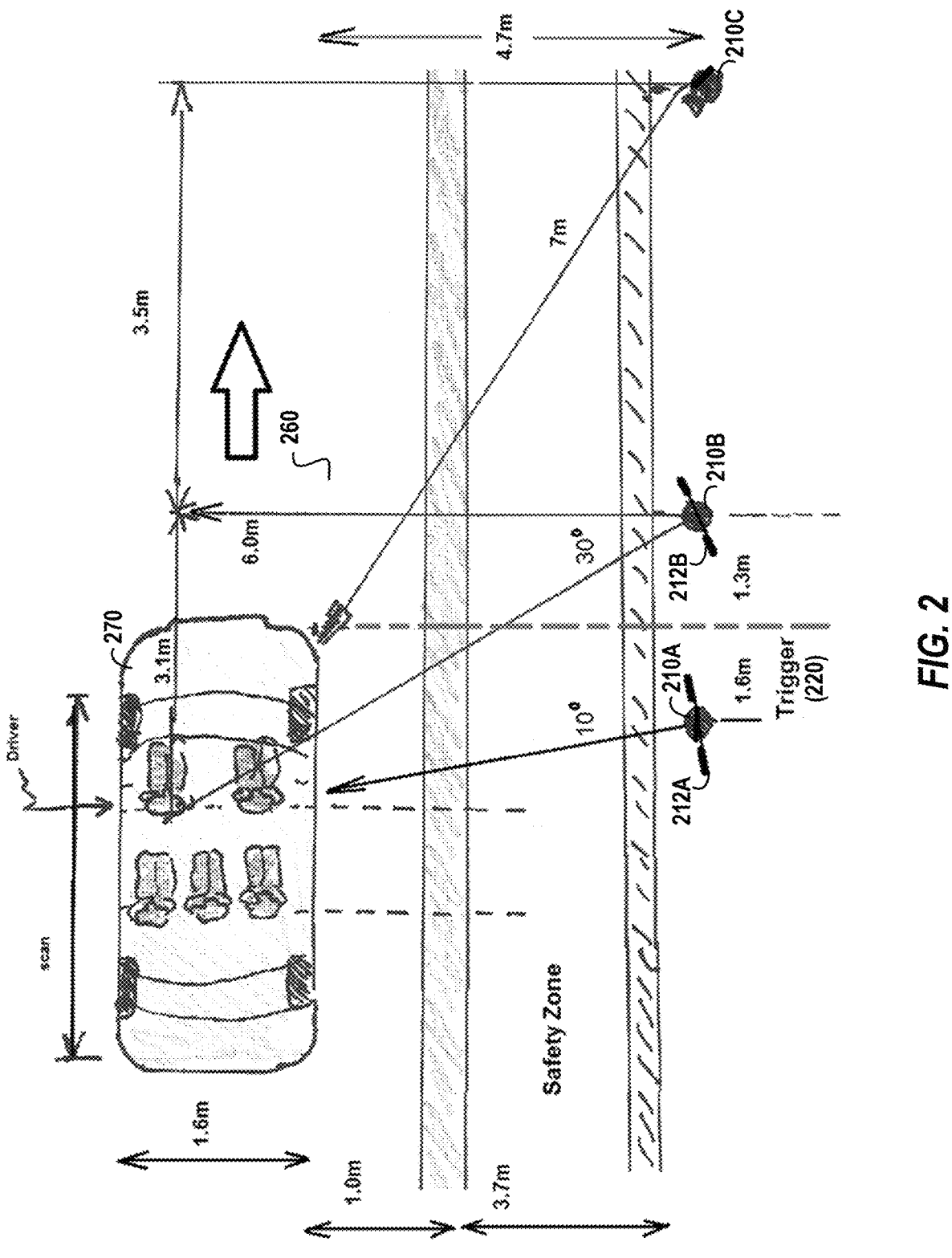
FIG. 2 illustrates further aspects of the described technologies.
Figure 3:
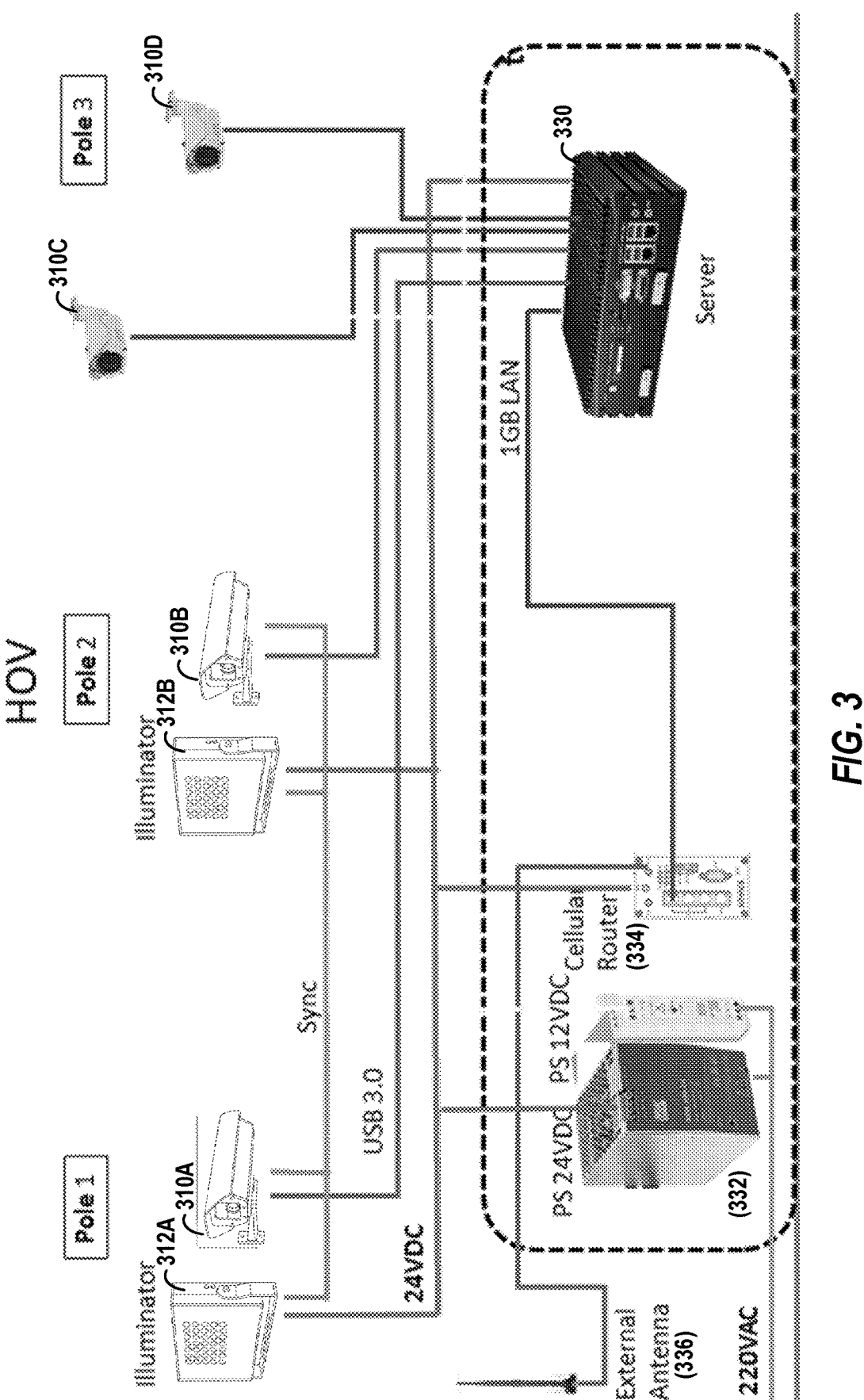
FIG. 3 illustrates further aspects of the described technologies.

FIG. 2 depicts another example implementation of the described technologies, from an overhead perspective. As shown in FIG. 2, multiple cameras 210A-210C can be deployed in various locations in relation to a traffic lane 260. Illumination device(s) 212A-212B can be deployed with respect to certain camera(s), as shown. The various cameras and illumination devices can be connected to a computing device 330 (e.g., a server, controller, etc.). Additionally, as shown, such devices/machines can be connected to various power supply device(s) 332, and various communication components such as router 334, antenna 336, etc. It should be understood that the depicted arrangement and properties are provided by way of illustration and are non-limiting FIG. 3 is another example implementation of the described technologies. As shown in FIG. 3, multiple cameras 310A-310D can be deployed in various locations in relation to an HOV lane. Illumination device(s) 312A-312B can be deployed with respect to certain camera(s), as shown. The various cameras and illumination devices can be connected to a computing device 330 (e.g., a server, controller, etc.). Additionally, as shown, such devices/machines can be connected to various power supply device(s) 332, and various communication components such as router 334, antenna 336, etc. It should be understood that the depicted arrangement and properties are provided by way of illustration and are non-limiting.

Figure 4:
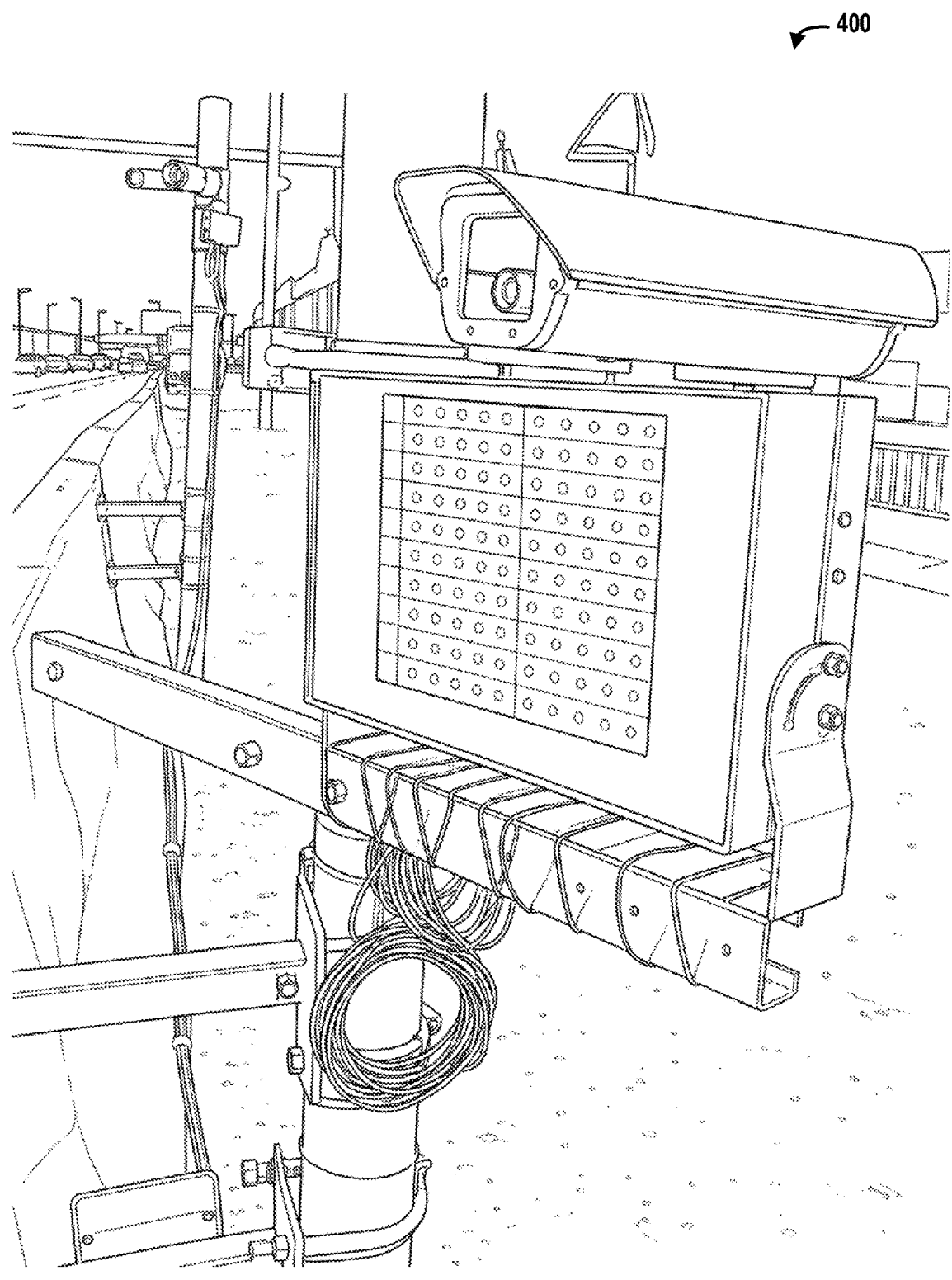
FIG. 4 illustrates further aspects of the described technologies.

As shown in FIG. 3 and described herein, in certain implementations various camera(s) can be configured with respect to illumination devices. In certain implementations, such cameras and illumination devices can be assembled together on a pole or other such assembly capable of maintaining the position of such camera(s)/device(s). One example pole assembly (with a camera and illumination device) is depicted in FIG. 4.

Figure 5:
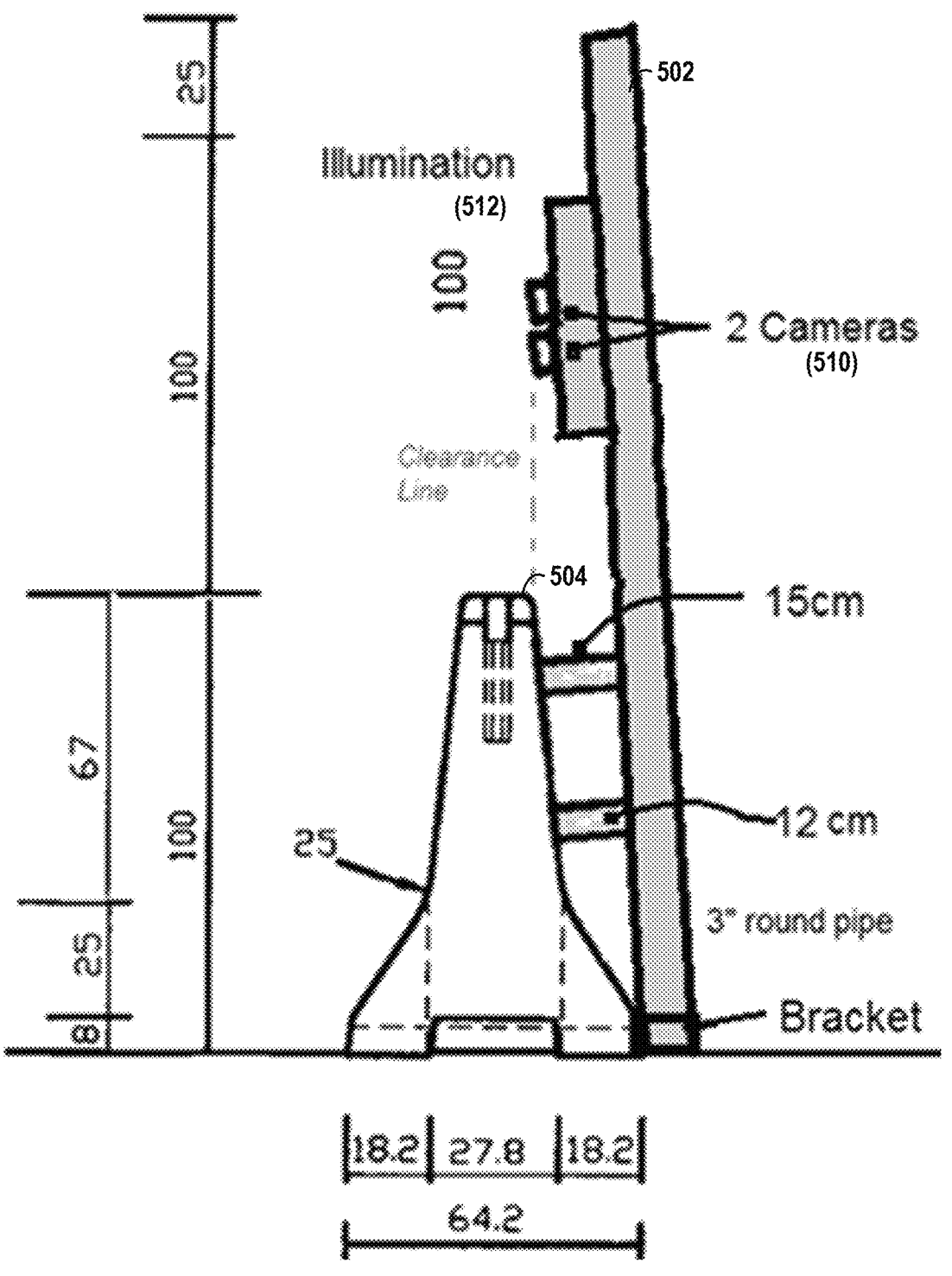
FIG. 5 illustrates further aspects of the described technologies.
Figure 6:
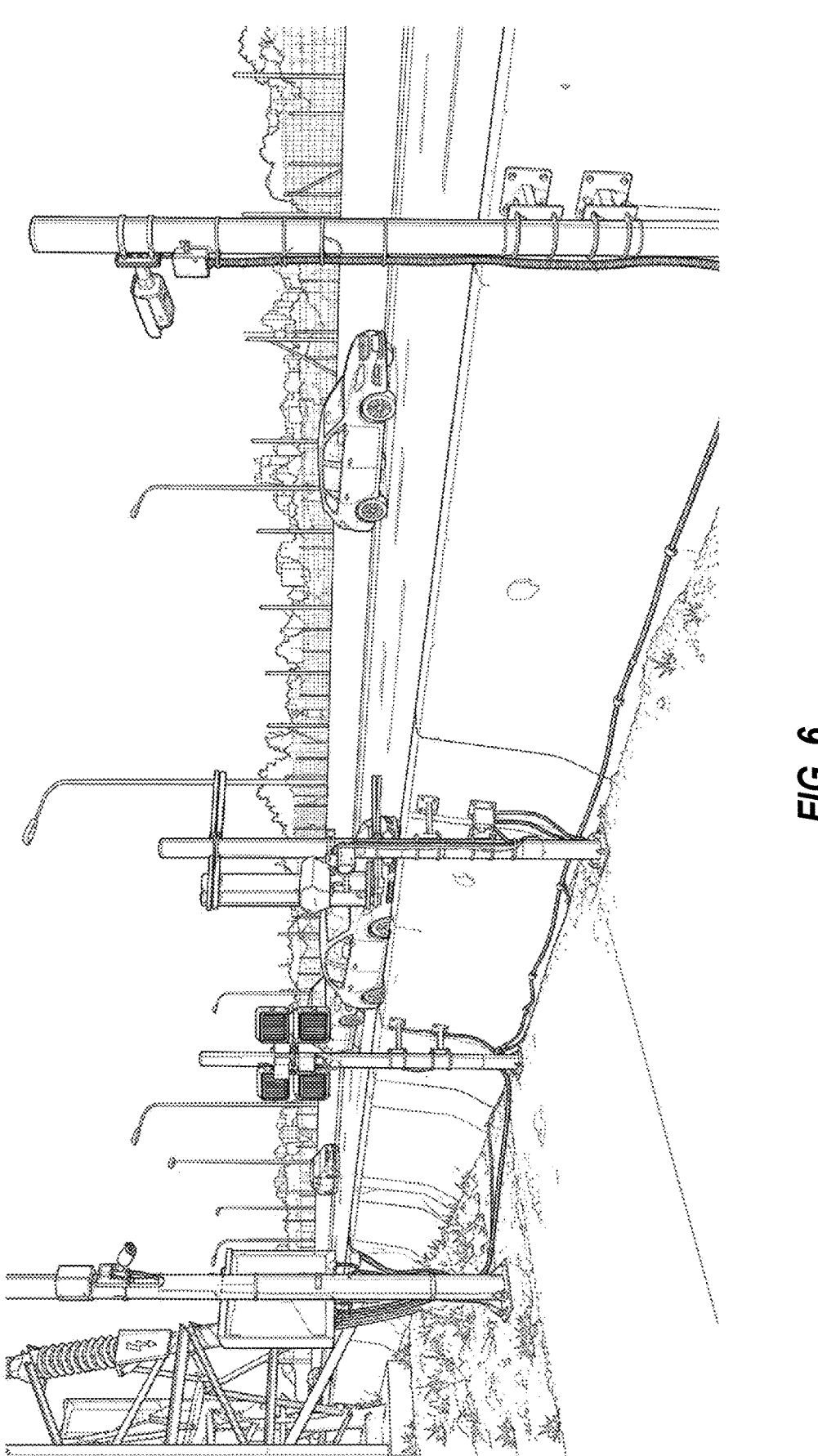
FIG. 6 illustrates further aspects of the described technologies.

Further aspects of such a pole assembly are shown in FIG. 5. As shown in FIG. 5, camera(s) 510 and illumination device(s) 512 can be positioned on pole 502. Pole 502 can be further configured to be affixed or secured in relation to a barrier 504 such as may be deployed on the side of a highway or traffic lane. An example deployment of such a pole assembly is shown in FIG. 6.

FIG. 8 depicts an example implementation with respect to a right-side lane, e.g., where the passenger side is located near the road's side wall to the right of the lane, and the system can be based on a side view only. In other scenarios, a front HOV camera can be added (e.g., operating in a single low band) to increase the detection rate and reduce false positives. Additionally, a LPR camera can capture the license plate from the front or rear, as described herein.

It should be noted that the cameras 110 described herein can be various types of cameras, such as area scan cameras, line scan cameras, etc. For example, an area scan camera can capture a two-dimensional view. The front view capture can be triggered when the vehicle crosses the detection line. On the side view a number of images can be captured, e.g., at a frame rate fast enough to capture overlapping images along the side of the vehicle.

Line scan cameras capture a one-dimensional (line) view of a single column (or a few columns in some camera models). Implemented within the described system, a line scan camera can be configured to operate vertically, with the vertical line viewing a different strip on the vehicle, as it drives through the line of scan. An image can be generated, constructed, built, etc. by appending each such strip line to create a two-dimensional view (similar to the area scan). Since the length of the image depends on the speed of the vehicle, the system can be configured to normalize the length of the image (e.g., by skipping on a number of columns, where the skip rate depends on the speed of the vehicle). In contrast to the area scan cameras, line scan cameras provide advantages such as being well suited for moving objects, being relatively low cost, providing higher resolutions, and the illumination can be concentrated on a narrow line rather than spreading it across the whole area.

In certain implementations, using line scan imagery can further enable the described technologies to compute other determinations. For example, the described technologies can be configured to compute the speed of the vehicle, e.g., in order to compensate for the speed with respect to the rates of the frame extraction. Therefore, in such implementations the described technologies can be configured to measure the speed of the vehicle. This can be done via various techniques—e.g., using dual loop detectors with detection and speed output; using a laser trigger with speed indication; or as a side effect of the LPR process by comparing the locations of the detected plates in successive frames. It should be understood that such examples are provided for purposes of illustration and that other techniques can also be implemented.

In operation, the described technologies capture image(s) that reflect or depict the interior of the vehicle (including occupants and internal vehicle elements, e.g., dashboard, seats, frame, etc.). The described technologies can process such images, e.g., to distinguish between the occupants and the other vehicle elements by form (e.g., three-dimensional characteristics), shape (e.g., two-dimensional characteristics), etc.

To increase detection performance/accuracy (e.g., of the occupants), the described technologies can be further configured to differentiate between occupants and other elements within the vehicle. Doing so can provide enhanced results and accuracy (e.g., as compared to relying on form and shape). For example, by sensing/determining heat levels of objects within the vehicle, human bodies can be more accurately identified. For example, imaging units operating in MWIR (midwave infrared) band (3,000-5,000 nm for cooled devices) or a LWIR (long wavelength infrared) band (9,000-14,000 nm for non-cooled devices) can be implemented.

Alternatively, in certain implementations occupants can be detected within a vehicle based on the identification of characteristics of the human within an image (e.g., aspects of human skin that differ in reflectance properties/characteristics as compared to the material of the vehicle parts, clothing, etc.). Because human skin surface and other surfaces show different reflection characteristics, the described technologies can differentiate between a human occupant and other items within the vehicle based on such determinations.

Figure 7:
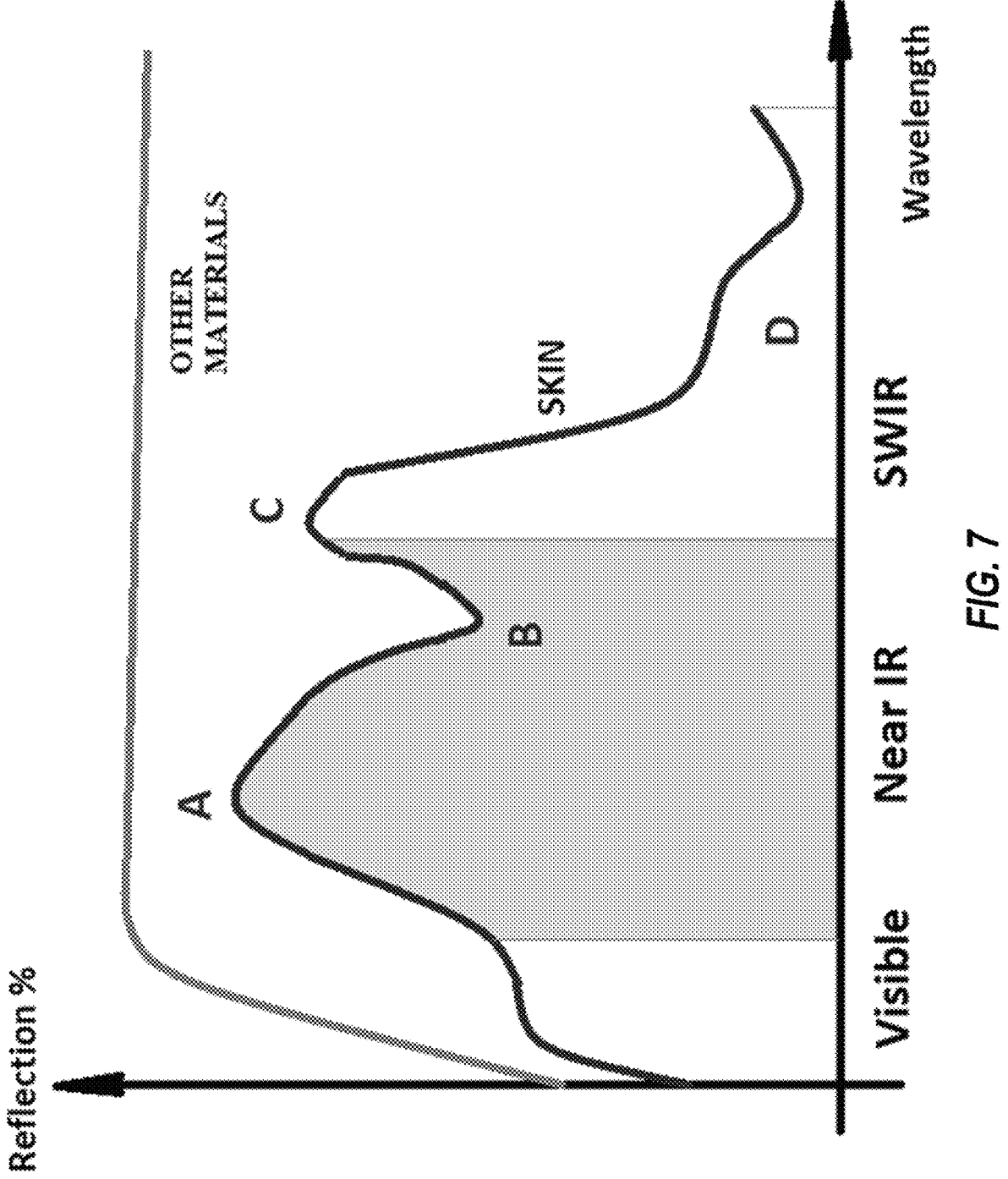
FIG. 7 illustrates further aspects of the described technologies.

FIG. 7 is a chart depicting aspects of the relative reflectance of the human skin and other material versus the wavelength, in accordance with certain implementations. Such reflectance is plotted against the bandwidth, indicating peaks and low points in the skin reflection. In contrast, the other materials have constant reflection in the infrared spectrum.

As shown in FIG. 7, various surfaces reflect different types of light across the spectrum differently. As shown in FIG. 7, skin reflection is affected by the spectrum, with strong peaks (A, C) and slumps (B, D) at different bands. In contrast, many materials are less affected by the wavelength infra-red band.

Accordingly, the described technologies can be configured to utilize such reflectance behavior(s) in distinguishing between human skin and other materials within an image. In one example implementation, the described technologies can utilize two infrared bands (low and high band) and compare the reflections between these bands to identify material as human skin or another material. For example, in band A (peak) and band B (slump), skin will have a reduced reflection while other material will have the same reflection. Accordingly, by configuring two cameras to capture images at these bands, the resulting images can be processed, e.g., by subtracting the brightness at each pixel of both images. Doing so can generate an enhanced image with bright spots at the locations of human skin. In doing so, the contrast of the faces of the occupants can be efficiently and automatically identified.

Using dual bands can also be used to check specific areas of such captured images, e.g., where the described application detects a possible face on the peak band, and check the drop in brightness on the lower band image. For example, the described cameras can be equipped with a narrow bandpass filter in order to capture only the lower or higher band. For each operation bands there can be a matching illumination unit (e.g., made of powerful LEDs illuminating in that band) or alternative illumination methods.

Accordingly, it can be appreciated that in various implementations of the described technologies, images of passing vehicles are captured from the side, front, or both front and side of a vehicle (e.g., via line scan or area scan camera acquisition). Using various separate infrared bands, the contrast between human skin and interior material is increased to enhance the detection capability. Image processing techniques can be applied to further increase the contrast and reduce the noise of the images. Deep learning networks can be trained and used to detect the window areas, the occupants within the areas, extract their number, and report the information to create a HOV abuse alert and/or otherwise initiate other operations or actions.

Figure 9:
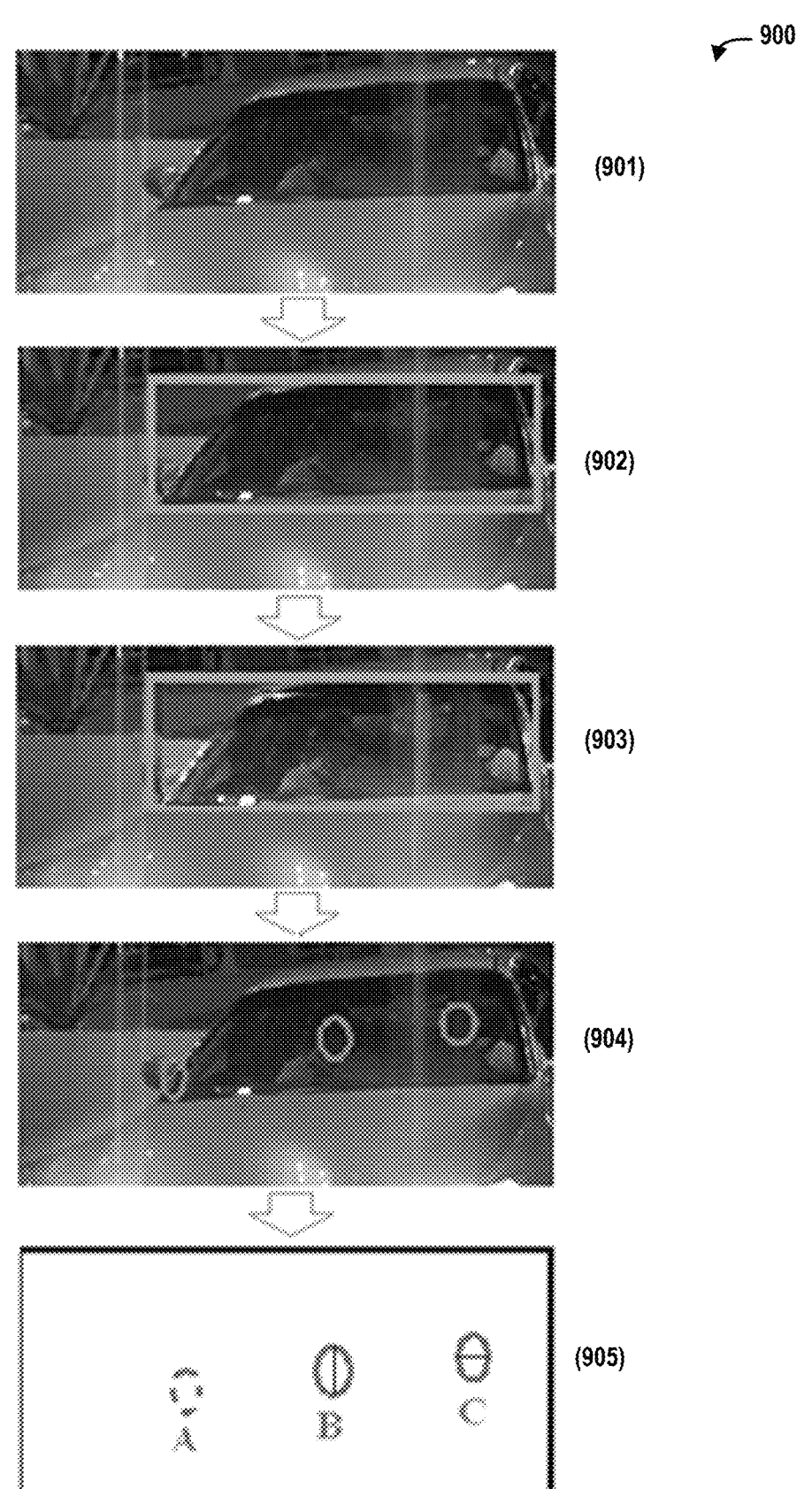
FIG. 9 is a flow chart illustrating a method, in accordance with example embodiments, for automated HOV violation detection.

FIG. 9 is a flow chart illustrating a method 900, according to an example embodiment, for automated HOV violation detection. The method is performed by processing logic that can comprise hardware (circuitry, dedicated logic, etc.), software (such as is run on a computing device such as those described herein), or any combination thereof. In one implementation, the method 900 is performed by one or more elements depicted and/or described in relation to FIG. 1 (including but not limited to controller 130), while in some other implementations, the one or more blocks of FIG. 9 can be performed by another machine or machines.

For simplicity of explanation, methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

As shown in FIG. 9, at operation 901 the input image(s) are preprocessed. At operation 902, window area(s) in the preprocessed image(s) can be detected (e.g., via machine learning or other techniques). At operation 903, images captured with respect to the two bands are combined, e.g., to produce a higher-contrast image within the window(s) area(s). At operation 904, the window area(s) can be processed (e.g., by another machine learning process) to detect possible locations and sizes of the faces. The resulting detection rectangles are then processed (e.g., by another machine learning process) (operation 905) to validate the detected areas and determine the number of occupants.

In certain implementations, the described technologies can be configured to identify occupants within a vehicle via various machine learning techniques such as convolutional neural networks (CNN) and/or other machine learning/deep learning techniques.

In implementing CNN network, an off-line learning phase can process captured images, e.g., with respect to annotations marked by a boundary box. The annotation program can identify an initial detection based on previously trained network, and their location and size can be reviewed and manually adjusted, e.g., to improve the outcome. After completing the annotation phase, a new training set is added to the previous set, and then subjected to the CNN network building session. After the training is complete, an improved network is created. The new network is then tested to verify that the results have improved, and to monitor the training sessions.

In the real-time execution phase, the trained network is used for detection on newly acquired images. As shown in FIG. 9, at operation 901 the input images are preprocessed, e.g., to scale them, and decrease the noise and increase the contrast of the occupants over the surrounding. In a first sub step of operation 901, the horizontal axis of the input image can be scaled, e.g., to compensate for the speed variance and the length of the vehicle. At a subsequent sub step of operation 901, noise can be filtered from the resulting product image.

At operation 902, the resulting image(s) can be processed, e.g., to detect windows area. From the front side of the vehicle there is one window to detect, but the side view of the vehicle can yield up to 3 window areas—the driver window, the rear seat window (one or two). This process can be performed by a trained CNN network, e.g., based on a training set of thousands of images (with each image annotated to define a bounding rectangle for the window area). After training the network, the network is used to run on the image to define one or more rectangles that bound the window(s) area(s).

At operation 903, the images can be enhanced (e.g., prior to face detection). The process is performed within the detected window area(s) from operation 902. First (operation 903*a*), the low band and high band images are cross correlated within the window areas (e.g., to account for shift between the images). Then (operation 903*b*) the low band image (e.g., with a maximum reflecting skin) is subtracted from the high band image (e.g., with the lower skin reflection characteristic). Doing so can reduce the contrast of the permanent areas that did not change their brightness, and increase the contrast of the faces. Next (operation 903*c*), the image brightness is normalized and enhanced (e.g., using histogram equalization), spreading out the most frequent intensity values within the window, and effectively stretching out the intensity range of the image.

At operation 904 possible areas of faces are detected. This operation can be performed by a pre-trained network, or by alternative detection algorithms. The network is prepared by annotating previously captured images, marking boundary rectangles of the occupants' faces. As a result, the locations of faces of occupants can be detected.

At operation 905, the described classification network can be optionally used as a global classifier (e.g., rather than a local classifier as in operation 904). The sizes and locations of the possible faces of the occupants, and optionally additional parameters can be identified. Its inputs include the two views (side and front). Using a pre-trained CNN network, the described technologies determine/identify the real faces, thereby removing potentially false positive cases (e.g., from the previous step) and merging the multiple views together.

In certain implementations, various post-processing operations can be performed, e.g., to account for privacy preferences, guidelines, or regulations. For example, faces of the occupants (or other identifying information) can be blurred on the images that are reported (e.g., for fines). Using locations of the faces (as determined from the identification phase), such areas can be used to blur the area by various methods (e.g., injecting grey levels into the areas of the face(s)).

The resulting image, together with the count of occupants, the license plate cropped image, and location and date/time of the event can be reported/output by the system. Further operations can be initiated based on such determinations, as described herein.

Figure 10:
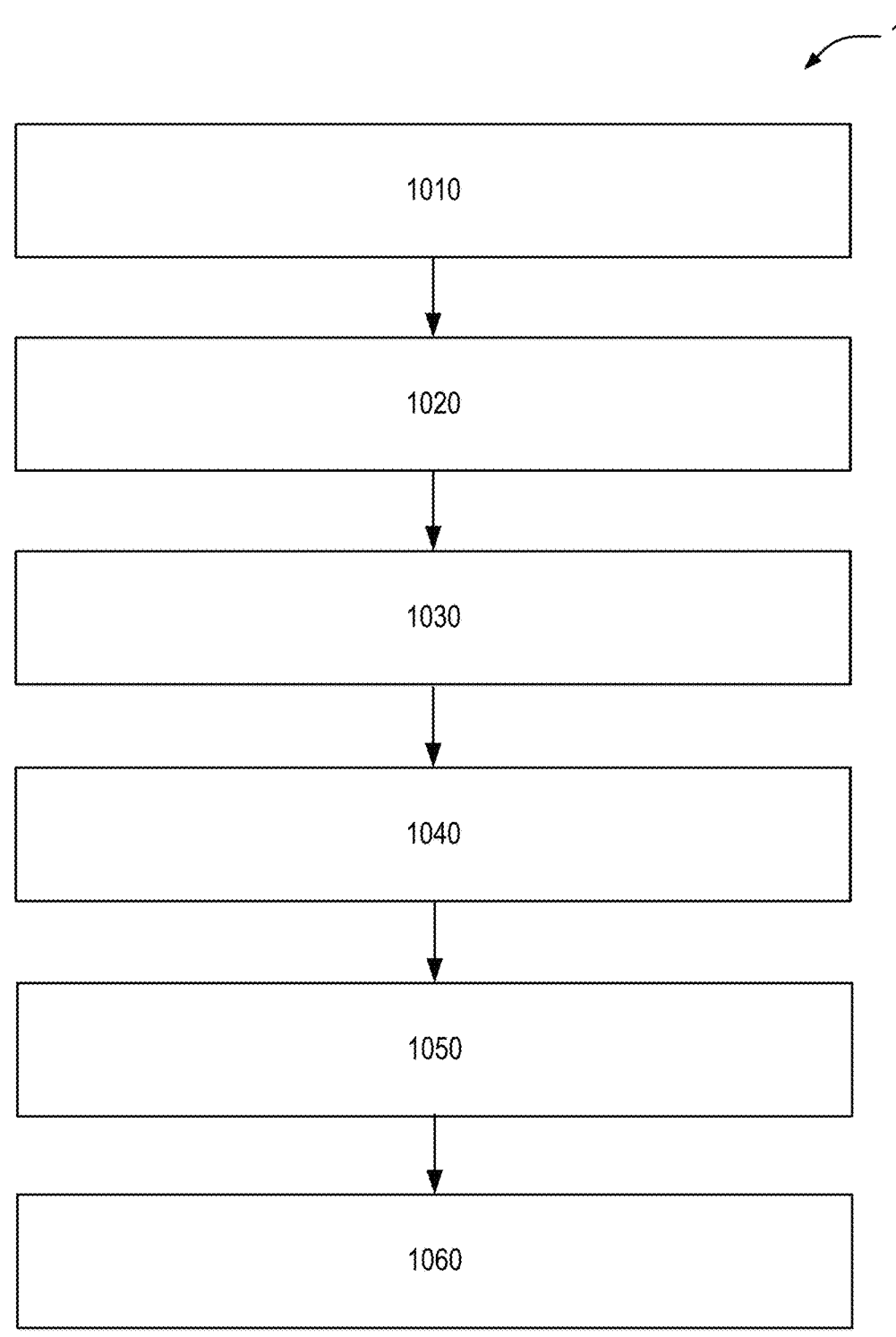
FIG. 10 is a flow chart illustrating a method, in accordance with example embodiments, for automated HOV violation detection.

FIG. 10 is a flow chart illustrating a method 1000, according to an example embodiment, for automated HOV violation detection. The method is performed by processing logic that can comprise hardware (circuitry, dedicated logic, etc.), software (such as is run on a computing device such as those described herein), or any combination thereof. In one implementation, the method 1000 is performed by one or more elements depicted and/or described in relation to FIG. 1 (including but not limited to controller 130), while in some other implementations, the one or more blocks of FIG. 10 can be performed by another machine or machines.

For simplicity of explanation, methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

At operation 1010 operations can be performed including processing one or more first images to train a neural network, such as is described in detail herein.

At operation 1020 operations can be performed including detecting a presence of a vehicle within a traffic lane, such as is described in detail herein.

At operation 1030 operations can be performed including based on the detection of the vehicle, capturing one or more second images and one or more third images, such as is described in detail herein.

At operation 1040 operations can be performed including processing the one or more one or more second images and the one or more third images using a neural network, such as is described in detail herein.

At operation 1050 operations can be performed including based on the processing of the one or more one or more second images and the one or more third images using the neural network, determining a number of occupants within the vehicle, such as is described in detail herein.

At operation 1060 operations can be performed including initiating one or more operations based on the determination, such as is described in detail herein.

As used herein, the term "configured" encompasses its plain and ordinary meaning. In one example, a machine is configured to carry out a method by having software code for that method stored in a memory that is accessible to the processor(s) of the machine. The processor(s) access the memory to implement the method. In another example, the instructions for carrying out the method are hard-wired into the processor(s). In yet another example, a portion of the instructions are hard-wired, and a portion of the instructions are stored as software code in the memory.

It should also be noted that while the technologies described herein are illustrated primarily with respect to automated HOV violation detection, the described technologies can also be implemented in any number of additional or alternative settings or contexts and towards any number of additional objectives.

Certain implementations are described herein as including logic or a number of components, modules, or mechanisms. Modules can constitute either software modules (e.g., code embodied on a machine-readable medium) or hardware modules. A "hardware module" is a tangible unit capable of performing certain operations and can be configured or arranged in a certain physical manner. In various example implementations, one or more computer systems (e.g., a standalone computer system, a client computer system, or a server computer system) or one or more hardware modules of a computer system (e.g., a processor or a group of processors) can be configured by software (e.g., an application or application portion) as a hardware module that operates to perform certain operations as described herein.

In some implementations, a hardware module can be implemented mechanically, electronically, or any suitable combination thereof. For example, a hardware module can include dedicated circuitry or logic that is permanently configured to perform certain operations. For example, a hardware module can be a special-purpose processor, such as a Field-Programmable Gate Array (FPGA) or an Application Specific Integrated Circuit (ASIC). A hardware module can also include programmable logic or circuitry that is temporarily configured by software to perform certain operations. For example, a hardware module can include software executed by a programmable processor. Once configured by such software, hardware modules become specific machines (or specific components of a machine) uniquely tailored to perform the configured functions. It will be appreciated that the decision to implement a hardware module mechanically, in dedicated and permanently configured circuitry, or in temporarily configured circuitry (e.g., configured by software) can be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering implementations in which hardware modules are temporarily configured (e.g., programmed), each of the hardware modules need not be configured or instantiated at any one instance in time. For example, where a hardware module comprises a processor configured by software to become a special-purpose processor, the processor can be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In implementations in which multiple hardware modules are configured or instantiated at different times, communications between such hardware modules can be achieved, for example, through the storage and retrieval of information in memory structures to which the multiple hardware modules have access. For example, one hardware module can perform an operation and store the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors can constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors can also operate to support performance of the relevant operations in a "cloud computing" environment or as a "software as a service" (SaaS). For example, at least some of the operations can be performed by a group of computers (as examples of machines including processors), with these operations being accessible via a network (e.g., the Internet) and via one or more appropriate interfaces (e.g., an API).

The performance of certain of the operations can be distributed among the processors, not only residing within a single machine, but deployed across a number of machines. In some example implementations, the processors or processor-implemented modules can be located in a single geographic location (e.g., within a home environment, an office environment, or a server farm). In other example implementations, the processors or processor-implemented modules can be distributed across a number of geographic locations.

The modules, methods, applications, and so forth described in conjunction with FIGS. 1-10 are implemented in some implementations in the context of a machine and an associated software architecture. The sections below describe representative software architecture(s) and machine (e.g., hardware) architecture(s) that are suitable for use with the disclosed implementations.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture can yield a smart device for use in the "internet of things," while yet another combination produces a server computer for use within a cloud computing architecture. Not all combinations of such software and hardware architectures are presented here, as those of skill in the art can readily understand how to implement the inventive subject matter in different contexts from the disclosure contained herein.

FIG. 11 is a block diagram illustrating components of a machine 1100, according to some example implementations, able to read instructions from a machine-readable medium (e.g., a machine-readable storage medium) and perform any one or more of the methodologies discussed herein. Specifically, FIG. 11 shows a diagrammatic representation of the machine 1100 in the example form of a computer system, within which instructions 1116 (e.g., software, a program, an application, an applet, an app, or other executable code) for causing the machine 1100 to perform any one or more of the methodologies discussed herein can be executed. The instructions 1116 transform the non-programmed machine into a particular machine programmed to carry out the described and illustrated functions in the manner described. In alternative implementations, the machine 1100 operates as a standalone device or can be coupled (e.g., networked) to other machines. In a networked deployment, the machine 1100 can operate in the capacity of a server machine or a client machine in a server-client network environment, or as a peer machine in a peer-to-peer (or distributed) network environment. The machine 1100 can comprise, but not be limited to, a server computer, a client computer, PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1116, sequentially or otherwise, that specify actions to be taken by the machine 1100. Further, while only a single machine 1100 is illustrated, the term "machine"

shall also be taken to include a collection of machines 1100 that individually or jointly execute the instructions 1116 to perform any one or more of the methodologies discussed herein.

The machine 1100 can include processors 1110, memory/ storage 1130, and I/O components 1150, which can be configured to communicate with each other such as via a bus 1102. In an example implementation, the processors 1110 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) can include, for example, a processor 1112 and a processor 1114 that can execute the instructions 1116. The term "processor" is intended to include multi-core processors that can comprise two or more independent processors (sometimes referred to as "cores") that can execute instructions contemporaneously. Although FIG. 11 shows multiple processors 1110, the machine 1100 can include a single processor with a single core, a single processor with multiple cores (e.g., a multi-core processor), multiple processors with a single core, multiple processors with multiples cores, or any combination thereof.

The memory/storage 1130 can include a memory 1132, such as a main memory, or other memory storage, and a storage unit 1136, both accessible to the processors 1110 such as via the bus 1102. The storage unit 1136 and memory 1132 store the instructions 1116 embodying any one or more of the methodologies or functions described herein. The instructions 1116 can also reside, completely or partially, within the memory 1132, within the storage unit 1136, within at least one of the processors 1110 (e.g., within the processor's cache memory), or any suitable combination thereof, during execution thereof by the machine 1100. Accordingly, the memory 1132, the storage unit 1136, and the memory of the processors 1110 are examples of machine-readable media.

As used herein, "machine-readable medium" means a device able to store instructions (e.g., instructions 1116) and data temporarily or permanently and can include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store the instructions 1116. The term "machine-readable medium" shall also be taken to include any medium, or combination of multiple media, that is capable of storing instructions (e.g., instructions 1116) for execution by a machine (e.g., machine 1100), such that the instructions, when executed by one or more processors of the machine (e.g., processors 1110), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1150 can include a wide variety of components to receive input, provide output, produce output, transmit information, exchange information, capture measurements, and so on. The specific I/O components 1150 that are included in a particular machine will depend on the type of machine. For example, portable machines such as mobile phones will likely include a touch input device or other such input mechanisms, while a headless server machine will likely not include such a touch input device. It will be appreciated that the I/O components 1150 can include many other components that are not shown in FIG. 11. The I/O components 1150 are grouped according to functionality merely for simplifying the following discussion and the grouping is in no way limiting. In various example implementations, the I/O components 1150 can include output components 1152 and input components 1154. The output components 1152 can include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1154 can include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example implementations, the I/O components 1150 can include biometric components 1156, motion components 1158, environmental components 1160, or position components 1162, among a wide array of other components. For example, the biometric components 1156 can include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1158 can include acceleration sensor components (e.g., accelerometer), gravitation sensor components, rotation sensor components (e.g., gyroscope), and so forth. The environmental components 1160 can include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that can provide indications, measurements, or signals corresponding to a surrounding physical environment. The position components 1162 can include location sensor components (e.g., a Global Position System (GPS) receiver component), altitude sensor components (e.g., altimeters or barometers that detect air pressure from which altitude can be derived), orientation sensor components (e.g., magnetometers), and the like.

Communication can be implemented using a wide variety of technologies. The I/O components 1150 can include communication components 1164 operable to couple the machine 1100 to a network 1180 or devices 1170 via a coupling 1182 and a coupling 1172, respectively. For example, the communication components 1164 can include a network interface component or other suitable device to interface with the network 1180. In further examples, the communication components 1164 can include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1170 can be another machine or any of a wide variety of peripheral devices (e.g., a peripheral device coupled via a USB).

Moreover, the communication components 1164 can detect identifiers or include components operable to detect identifiers. For example, the communication components 1164 can include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information can be derived via the communication components 1164, such as location via Internet Protocol (IP) geolocation, location via Wi-Fi® signal triangulation, location via detecting an NFC beacon signal that can indicate a particular location, and so forth.

In various example implementations, one or more portions of the network 1180 can be an ad hoc network, an intranet, an extranet, a virtual private network (VPN), a local area network (LAN), a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 1180 or a portion of the network 1180 can include a wireless or cellular network and the coupling 1182 can be a Code Division Multiple Access (CDMA) connection, a Global System for Mobile communications (GSM) connection, or another type of cellular or wireless coupling. In this example, the coupling 1182 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 11G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 1116 can be transmitted or received over the network 1180 using a transmission medium via a network interface device (e.g., a network interface component included in the communication components 1164) and utilizing any one of a number of well-known transfer protocols (e.g., HTTP). Similarly, the instructions 1116 can be transmitted or received using a transmission medium via the coupling 1172 (e.g., a peer-to-peer coupling) to the devices

1170. The term "transmission medium" shall be taken to include any intangible medium that is capable of storing, encoding, or carrying the instructions 1116 for execution by the machine 1100, and includes digital or analog communications signals or other intangible media to facilitate communication of such software.

Throughout this specification, plural instances can implement components, operations, or structures described as a single instance. Although individual operations of one or more methods are illustrated and described as separate operations, one or more of the individual operations can be performed concurrently, and nothing requires that the operations be performed in the order illustrated. Structures and functionality presented as separate components in example configurations can be implemented as a combined structure or component. Similarly, structures and functionality presented as a single component can be implemented as separate components. These and other variations, modifications, additions, and improvements fall within the scope of the subject matter herein.

Although an overview of the inventive subject matter has been described with reference to specific example implementations, various modifications and changes can be made to these implementations without departing from the broader scope of implementations of the present disclosure. Such implementations of the inventive subject matter can be referred to herein, individually or collectively, by the term "invention" merely for convenience and without intending to voluntarily limit the scope of this application to any single disclosure or inventive concept if more than one is, in fact, disclosed.

The implementations illustrated herein are described in sufficient detail to enable those skilled in the art to practice the teachings disclosed. Other implementations can be used and derived therefrom, such that structural and logical substitutions and changes can be made without departing from the scope of this disclosure. The Detailed Description, therefore, is not to be taken in a limiting sense, and the scope of various implementations is defined only by the appended claims, along with the full range of equivalents to which such claims are entitled. As used herein, the term "or" can be construed in either an inclusive or exclusive sense. Moreover, plural instances can be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and can fall within a scope of various implementations of the present disclosure. In general, structures and functionality presented as separate resources in the example configurations can be implemented as a combined structure or resource. Similarly, structures and functionality presented as a single resource can be implemented as separate resources. These and other variations, modifications, additions, and improvements fall within a scope of implementations of the present disclosure as represented by the appended claims. The specification and drawings are, accordingly, to be regarded in an illustrative rather than a restrictive sense.

What is claimed is:

1. A system comprising:
   a processing device; and
   a memory coupled to the processing device and storing instructions that, when executed by the processing device, cause the system to perform operations comprising:

detecting a presence of a vehicle within a traffic lane;

based on the detection of the presence of the vehicle within the traffic lane, capturing one or more second images under a first illumination and one or more third images under a second illumination that is different from the first illumination;

processing the one or more one or more second images and the one or more third images using a neural network;

based on the processing of the one or more one or more second images and the one or more third images using the neural network, determining a number of occupants within the vehicle; and initiating one or more operations based on the determination.

2. The system of claim 1, further comprising processing one or more first images to train a neural network.

3. The system of claim 1, wherein the one or more second images comprise images of a side of the vehicle.

4. The system of claim 1, wherein the one or more third images comprise images of a front of the vehicle.

5. The system of claim 1, wherein determining a number of occupants within the vehicle comprises determining the number of occupants based on a determination with respect to a reflectance of illumination with respect to the skin of an occupant.

6. A method comprising:

processing one or more first images to train a neural network;

detecting a presence of a vehicle within a traffic lane;

based on the detection of the vehicle within the traffic lane, capturing one or more second images under a first illumination and one or more third images under a second illumination that is different from the first illumination;

processing the one or more one or more second images and the one or more third images using a neural network;

based on the processing of the one or more one or more second images and the one or more third images using the neural network, determining a number of occupants within the vehicle; and initiating one or more operations based on the determination.

7. The method of claim 6, wherein the one or more second images comprise images of a side of the vehicle.

8. The method of claim 6, wherein the one or more third images comprise images of a front of the vehicle.

9. The method of claim 6, wherein determining a number of occupants within the vehicle comprises determining the number of occupants based on a determination with respect to a reflectance of illumination with respect to the skin of an occupant.

10. A non-transitory computer readable medium having instructions stored thereon that, when executed by a processing device, cause the processing device to perform one or more operations comprising:

processing one or more first images to train a neural network;

detecting a presence of a vehicle within a traffic lane;

based on the detection of the vehicle within the traffic lane, capturing one or more second images under a first illumination and one or more third images under a second illumination that is different from the first illumination;

processing the one or more one or more second images and the one or more third images using a neural network;

based on the processing of the one or more one or more second images and the one or more third images using the neural network, determining a number of occupants within the vehicle; and initiating one or more operations based on the determination.

11. The non-transitory computer readable medium of claim 10, wherein the one or more second images comprise images of a side of the vehicle.

12. The non-transitory computer readable medium of claim 10, wherein the one or more third images comprise images of a front of the vehicle.

13. The non-transitory computer readable medium of claim 10, wherein capturing the one or more third images comprises capturing the one or more second images under a second illumination.

14. The non-transitory computer readable medium of claim 10, wherein determining a number of occupants within the vehicle comprises determining the number of occupants based on a determination with respect to a reflectance of illumination with respect to the skin of an occupant.

* * * * *